Sept. 28, 1954     E. P. GOODMANN ET AL     2,690,419
RECOVERY OF SPENT DOCTOR SOLUTION
Filed March 11, 1952
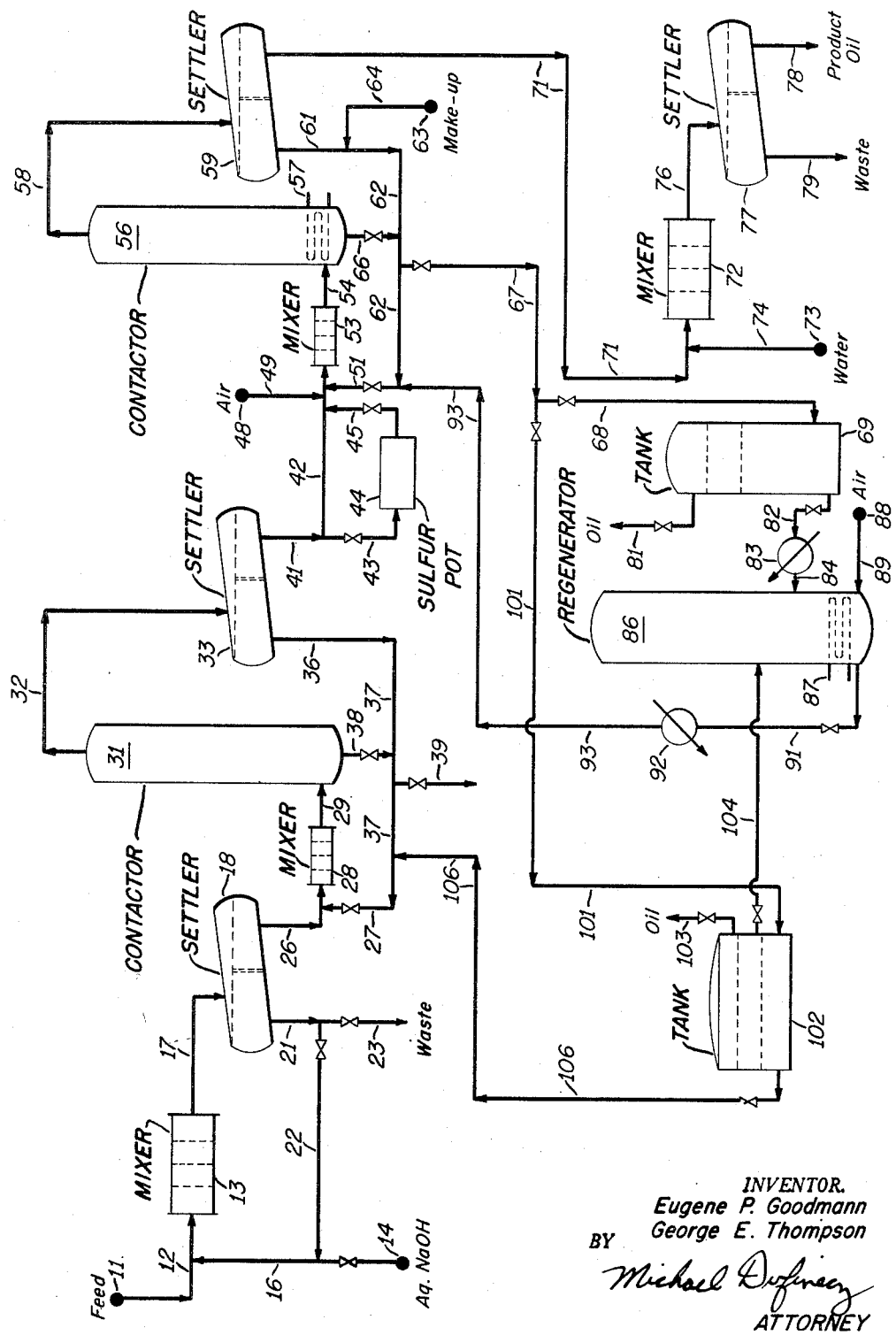
INVENTOR.
Eugene P. Goodmann
George E. Thompson
BY
Michael Dufney
ATTORNEY Patented Sept. 28, 1954

2,690,419

UNITED STATES PATENT OFFICE 2,690,419

RECOVERY OF SPENT DOCTOR SOLUTION

Eugene P. Goodmann, Highland, Ind., and George E. Thompson, Chicago, Ill., assignors to Standard Oil Company, Chicago, Ill., a corporation of Indiana Application March 11, 1952, Serial No. 275,904

2 Claims. (Cl. 196—33)

This invention relates to the doctor process for sweetening hydrocarbon oils which contain objectionable amounts of mercaptans. More particularly, it relates to the recovery of the plumbite content of spent doctor solution. Still more particularly, it relates to the sweetening of $H_2S$-free sour hydrocarbon oils which contain appreciable amounts of phenolic compounds.

The doctor process is probably the oldest method for converting foul smelling mercaptans present in hydrocarbon oils to bland smelling disulfides. In this process a $H_2S$-free, sour hydrocarbon oil is contacted with an aqueous solution of caustic and alkali metal plumbite in the presence of free-sulfur. The mercaptans in the sour oil react with the plumbite to form oil soluble lead mercaptides; the free-sulfur reacts with the lead mercaptides to form lead sulfide and disulfides. The substantially sweet oil is separated from the spent doctor solution which comprises oil, lead sulfide, alkali metal salts and alkali metal plumbite.

Fresh doctor solution normally consists of aqueous caustic such as sodium hydroxide in the concentration between about 5 and 30 weight percent, preferably 15 to 20%, and the reaction product of the caustic and litharge. The lead content of the solution is usually expressed in grams of litharge per 100 ml. of solution. Usually the fresh doctor solution contains between about 2 and 4 g. of lead, as PbO, per 100 ml. of solution. It is preferred to use a solution containing between about 2.5 and 3.5 g. of lead.

The spent doctor solution is sent to a storage vessel and permitted to settle for some time. Three layers appear in the vessel, a top layer consisting of oil which is normally drawn off and recycled to the feed to the process, an intermediate layer consisting of the very stable emulsion of PbS, aqueous caustic solution and oil; this emulsion is commonly spoken of as blackstrap. The bottom layer is generally spoken of as spent plumbite solution and contains the unconsumed alkali metal plumbite; generally the spent plumbite solution contains less than 1 g. of lead, as PbO, per 100 ml. of solution. The emulsion and the spent plumbite solution are usually sent to regeneration together. In the regenerator the emulsion and spent plumbite solution are heated to between about 150° and 200° F. and contacted with large amounts of air.

The contacting is continued until substantially all the PbS has been converted to plumbite. The regenerated doctor solution is usually fortified with fresh doctor solution to bring the lead content to the desired level before returning the regenerated solution to the treating process. The doctor solution can be reused and regenerated many times, particularly when a high percentage of makeup is used in each cycle. Eventually inorganic salts build up in the spent plumbite solution to such an amount that the spent plumbite solution is considered to be non-regenerable. The inorganic salts interfere with the ease of separation of the sweet oil and the spent doctor solution, i. e., they increase emulsification and cause large losses of doctor solution in the sweet oil. The non-regenerable spent plumbite solution is normally treated with hydrogen sulfide or sodium sulfide to precipitate the plumbite content in the form of PbS, which PbS is recovered and sent to the regeneration operation. Some refiners use the non-regenerable plumbite solution to treat the $H_2S$ containing sour oil; this procedure results in the loss of plumbite content of the non-regenerable plumbite solution.

When the doctor process is used on virgin naphthas, the recovery of the plumbite content of non-regenerable plumbite solution is simple and straightforward. However, when the doctor process is used to treat hydrocarbon oils that contain appreciable amounts of phenolic compounds, these phenolic compounds are extracted from the oil by the doctor solution. The phenolic compounds are considered to be objectionable components of the doctor solution because they interfere with phase separation and with regeneration of the spent doctor solution. The presence of large amounts of phenolic compounds in the spent doctor solution requires the solution to be discarded more frequently than in the case of processes wherein the sour oil contains no phenolic compounds. It has been found that the usual procedure for recovering the plumbite content of the phenolic compound containing non-regenerable spent plumbite solution by precipitation with $H_2S$ or sodium sulfide is inoperative. The phenolic compounds substantially prevent the separation of the PbS from the solution in a practicable settling time. The use of prolonged settling times or centrifugal separation is uneconomic in view of the low lead content of the foul alkali metal plumbite solution. It has been found that when the foul alkali metal plumbite solution contains at least about 15 volume percent of phenolic compounds, substantially none of the plumbite content is recoverable by precipitation as lead sulfide.

An object of this invention is an improved doctor process for sweetening H₂S-free, sour hydrocarbon oils which contain appreciable amounts of phenolic compounds. Another object is to recover the plumbite content of a so-called non-regenerable spent alkali metal plumbite solution, which plumbite content cannot be recovered by precipitation as lead sulfide. Still another object is an improved doctor process for sweetening cracked naphthas.

It has been discovered that a substantial proportion of the plumbite content of a foul alkali metal plumbite solution, which solution comprises alkali metal salts, minor amounts of oil and lead sulfide and an amount of phenolic compounds such that the plumbite content cannot be recovered by precipitation as lead sulfide, can be recovered by contacting said foul solution with a H₂S-free, sour hydrocarbon oil under conditions to convert said plumbite content to oil soluble lead mercaptides. The sour oil containing the resulting lead mercaptides is separated from the foul solution now substantially reduced in plumbite content; this oil is a suitable feed for a doctor process operation.

The invention is described in more detail in connection with the embodiment illustrated in the figure, which figure is made a part of this specification. The figure shows a typical doctor process operation for the sweetening of a sour hydrocarbon oil. It is to be understood that this embodiment is illustrative only and is not intended to limit the scope of the invention. Further, it is understood that numerous pumps, valves and miscellaneous pieces of equipment have been omitted from the figure. These items may be readily added thereto by one skilled in this art.

The feed to this improved doctor process may be any hydrocarbon oil which contains objectionable amounts of mercaptans and appreciable amounts of phenolic compounds. Particularly suitable feeds are cracked naphthas either thermally cracked, or catalytically cracked naphthas. It is well known that all cracked naphthas and cracked gas oils contain appreciable amounts of phenolic compounds. However, many virgin oils which boil in the heavier-than-gasoline range contain appreciable amounts of phenolic compounds, e. g., a heater oil boiling between about 350° and 600° F. which was derived by distillation of West Texas crude had a phenolic compound content of 0.2 volume percent. These phenolic compounds were extracted by contacting the oil with 50% KOH solution. The phenolic compounds had an A. S. T. M. distillation range between about 375° and 560° F. The term "phenolic compounds" is intended to include phenol, cresol, xylenol and any alkylhydroxybenzene naturally occurring in virgin or cracked hydrocarbon oils. In this illustration the feed is a stabilized cracked heavy naphtha having a copper number of 14.

The feed, 600 bbls./hr., from source 11 is passed through line 12 into mixer 13. Dilute aqueous sodium hydroxide solution from source 14 is passed by way of line 16 into line 12 where it meets the feed. The aqueous caustic solution is used to remove the H₂S present in the feed so that its concentration may be quite low, e. g., 5 weight percent. Sufficient aqueous caustic should be used to remove substantially all the H₂S in one contacting zone. In this example 10 volume percent of aqueous caustic is used, based on feed. Mixer 13 may be any form of device for thoroughly intermingling the feed and the aqueous caustic. In this case mixer 13 is a drum provided with a plurality of perforated plates.

From mixer 13 the commingled stream is passed through line 17 into settler 18. From settler 18 the aqueous caustic phase is withdrawn by way of line 21 and may be recycled to line 16 by way of valved line 22. When the aqueous caustic is substantially spent, it may be discharged to the sewer by way of lines 21 and 23.

The H₂S-free feed is passed from settler 18 into line 26 where it meets a stream of foul sodium plumbite solution from valved line 27. The amount of foul sodium plumbite solution used will vary with operating conditions, but in general will be between about 5 and 100 volume percent, based on H₂S-free feed; herein 10% is used. The H₂S-free feed and the foul solution are passed into mixer 28 where they are thoroughly intermingled. Mixer 28 is similar in construction to mixer 13. The commingled stream is passed from mixer 28 by way of line 29 into contactor 31. Contactor 31 is a large vertical cylindrical vessel. Contactor 31 is operated so that it is about two-thirds full of the foul solution. From the top of contactor 31 a mixed stream of oil and foul solution is withdrawn by way of line 32 into settler 33. Separated foul solution is withdrawn from settler 33 by way of line 36 and may be recycled to line 26 by way of lines 37 and 27. Contactor 31 is provided with a valved bottom draw-off line 38 which joins line 37. The plumbite denuded foul solution is withdrawn from the system by way of valved line 39. This plumbite denuded foul solution may be used to remove H₂S from the feed oil or may be sent to waste disposal.

The mercaptans present in the H₂S-free feed react with the sodium plumbite in the foul solution. The lead mercaptides are oil soluble and dissolve in the oil. The lead mercaptide containing oil is passed out of settler 33 by way of lines 41 and 42. An aliquot amount of oil is withdrawn from line 41 and is passed by way of valved line 43 through sulfur pot 44 and valved line 45 into line 42.

Sulfur pot 44 is a vessel filled with lump sulfur. The amount of sulfur added to the system is dependent upon the mercaptan content of the oil in line 41. Usually it is necessary to employ an excess of free-sulfur over the stoichiometric quantity. However, the amount of free-sulfur added should be carefully controlled in order to avoid the presence of corrosive sulfur in the product oil. In this example the free-sulfur usage is 160% of the theoretical.

Although it is not necessary to have free-oxygen present in the doctor solution contacting zone, it has been found that the regeneration load is lightened and phase separation is improved by the presence of free-oxygen. The free-oxygen is introduced into the system in the form of air from source 48. In this example about 50 standard cu. ft. per minute of air are passed from source 48 through line 49 into line 42.

Doctor solution containing 3 g. of lead, as PbO, per 100 ml. of solution is introduced by way of line 51 into line 42. In this case the free sodium hydroxide of the doctor solution is 15 weight percent. The amount of doctor solution used per volume of oil being treated may vary from about 1 volume percent to as much as 100%; preferably the doctor solution usage is between about 10 and 25%. In this example 15% of doctor solution is used based on oil in line 42.

The contents of line 42, i. e., oil, sulfur, air and doctor solution are passed into mixer 53 where they are thoroughly intermingled. Mixer 53 is similar in construction to mixer 13. The commingled stream is passed through line 54 into contactor 56, which contactor is provided with internal heat exchanger 57. The sweetening reaction is relatively slow and a long contacting time is provided in contactor 56 by maintaining a high level of doctor solution therein. To speed up the reaction the contents of contactor 56 are maintained at a temperature of about 90° F. A mixture of sweet oil and doctor solution is taken overhead from contactor 56 through line 58 and is passed into settler 59.

Spent doctor solution is withdrawn from settler 59 by way of line 61 and is recycled to line 42 by way of lines 62 and 51. Some doctor solution is lost through carryover in the sweet oil and this loss is made up by the addition of makeup doctor solution. Makeup doctor solution which contains about 4 g. of lead is passed from source 63 by way of line 64 into line 61. Contactor 56 is provided with a bottom draw-off valved line 66 which joins line 62. The plumbite content of the doctor solution is gradually depleted and at a lead content of about 1 g., the doctor solution is considered to be in need of regeneration. The spent doctor solution is passed to regeneration by way of valved lines 67 and 68 into tank 69.

The sweet oil from settler 59 contains a considerable amount of suspended doctor solution. The lead compounds adversely affect the color stability of the sweet oil and should be removed. Conventional procedure for this removal is water washing. The oil from settler 59 is passed by way of line 71 into mixer 72. Wash water from source 73 is passed through line 74 into line 71. The amount of wash water will vary with the condition of the oil; in this example, 50 volume percent, based on oil, of water is used. The mixed water-oil stream is passed from mixer 72 through line 76 into settler 77. The sweet product oil substantially free of doctor solution and PbS is passed to storage not shown by way of line 78. The separated wash water is passed to the sewer by way of line 79.

The spent doctor solution comprises a considerable amount of oil, unconsumed sodium plumbite, inorganic salts, phenolic compounds and lead sulfide. The spent doctor solution in tank 69 is allowed to settle for some time. Three layers appear in the tank. The upper layer consists of oil. This oil is removed by way of valved line 81 and is recycled to line 12 by way of lines not shown. The intermediate layer consists of an emulsion of spent plumbite solution, PbS and oil. The bottom layer consists of a sodium plumbite solution, which solution comprises unconsumed sodium plumbite, phenolic compounds, inorganic salts and minor amounts of PbS and oil. In this case both the bottom layer and the middle layer are withdrawn from tank 69 by way of valved line 82 and are passed through heat exchanger 83 and line 84 into regenerator 86. Regenerator 86 is provided with an internal heat exchanger 87. The temperature of the contents of regenerator 86 are maintained at about 200° F. while a large quantity of air from source 88 and line 89 is introduced into the bottom of the regenerator. The contents of the regenerator are blown until all the PbS has been converted to sodium plumbite, which process normally takes between 24 and 72 hours. The regenerated doctor solution is withdrawn from regenerator 86 through valved line 91 and is passed through heat exchanger 92 where the temperature is lowered to about 100° F.; the cooled doctor solution is passed through line 93 into line 51 for reuse in the sweetening operation.

Gradually there is a buildup of inorganic salts and phenolic compounds in the regenerated doctor solution. It has been found that the phenolic compound content of the spent sodium plumbite solution may get as high as 40 volume percent. Normally the spent sodium plumbite solution will have reached the point of substantial non-regenerability before the solution is saturated with respect to phenolic compounds. When the spent doctor solution is considered to be non-regenerable, it is passed from the system by way of line 67 and valved line 101 to tank 102. In tank 102 the non-regenerable spent doctor solution is allowed to settle until three layers appear. The upper layer of oil is withdrawn through line 103 and is sent to line 12 by way of lines not shown. The intermediate emulsion layer is withdrawn by way of valved line 104 and is sent to regenerator 86 for recovery of the PbS content. The bottom layer is known herein as foul sodium plumbite solution.

The foul sodium plumbite solution comprises minor amounts of oil and PbS, sodium plumbite, a large amount of inorganic salts and at least about 15 volume percent of phenolic compounds. The sodium plumbite content will usually be between about 0.3 and 1 g. of lead, as PbO, per 100 ml. of solution. The phenolic compound content in some cases may be less than about 15 volume percent, but usually will be between about 15 and 25%. It is to be understood that foul sodium plumbite solution containing less than about 15 volume percent of phenolic compounds can be used in this process. However, when the phenolic compound content is below about 10%, conventional recovery methods for the plumbite content are feasible. It has been found that substantially none of the plumbite content of a foul sodium plumbite solution containing at least about 15% of phenolic compounds can be recovered by treating the solution with H₂S or sodium sulfide; the PbS formed is retained in the solution in the form of a very stable suspension which does not separate even on prolonged standing. The foul sodium plumbite solution from tank 102 is passed through line 106 into line 37. The foul sodium plumbite solution is introduced into line 26 by way of lines 37 and 27.

As an example of the results obtainable with this invention the following large scale test is described. A foul sodium plumbite solution which contained 0.6 g. of lead, as PbO, per 100 ml. of solution and 25 volume percent of phenolic compounds was contacted with an H₂S-free stabilized heavy naphtha having a copper number of 10. The volume ratio of foul solution to feed was 1:10. After two days of operation the plumbite content of the foul solution has decreased to 0.3 g. of lead and after four days the plumbite content of the foul solution had decreased to 0 g. of lead. At this point the test was discontinued and the plumbite denuded foul solution was discarded.

Having described the invention, what is claimed is:

1. A process for sweetening a H₂S-free, sour hydrocarbon oil which contains an appreciable amount of phenolic compounds and objectionable amounts of mercaptans, which process comprises the steps of (1) contacting said sour oil with a foul alkali-metal plumbite solution, (2) separating a sour oil containing lead mercaptides from said foul solution, (3) contacting said oil from step (2) with an alkali-metal plumbite doctor solution under conditions to convert mercaptans to lead mercaptides and with an amount of free-sulfur sufficient to convert the lead mercaptides to lead sulfide and disulfides, (4) separating a substantially sweet oil from a spent doctor solution which comprises oil, lead sulfide, phenolic compounds, alkali-metal salts, and alkali-metal plumbite, (5) regenerating said spent doctor solution, recycling said regenerated solution to step (3) and continuing said treatment until the spent doctor solution contains an amount of phenolic compounds and alkali-metal salts such that it cannot be completely regenerated, (6) separating said non-regenerable spent doctor solution into an oil layer, an emulsion layer comprising lead sulfide and aqueous caustic, and a foul alkali-metal plumbite solution comprising alkali-metal salts, minor amounts of oil and lead sulfide, and at least about 15 volume percent of phenolic compounds, and (7) recovering a substantial proportion of the plumbite content of said foul solution by passing said foul solution to step (1) of the process.

2. The process of claim 1 wherein said $H_2S$-free, sour hydrocarbon oil is a cracked naphtha.

References Cited in the file of this patent
UNITED STATES PATENTS

| Number | Name | Date |
| --- | --- | --- |
| 2,311,328 | Brower | Feb. 16, 1943 |
| 2,338,579 | Fischer | Jan. 4, 1944 |